(12) United States Patent
Matczynski et al.

(10) Patent No.: US 9,455,882 B2
(45) Date of Patent: Sep. 27, 2016

(54) USER DEFINED ARRANGEMENT OF RESOURCES IN A CLOUD COMPUTING ENVIRONMENT

(71) Applicant: Verizon Patent and Licensing Inc., Basking Ridge, NJ (US)

(72) Inventors: Michael J Matczynski, Waltham, MA (US); Paul M Curtis, Sudbury, MA (US); Marc J Cochran, Shrewsbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 235 days.

(21) Appl. No.: 13/923,952

(22) Filed: Jun. 21, 2013

(65) Prior Publication Data

US 2014/0380175 A1     Dec. 25, 2014

(51) Int. Cl.
  *H04L 12/24* (2006.01)
  *H04L 29/08* (2006.01)

(52) U.S. Cl.
  CPC ....... *H04L 41/5019* (2013.01); *H04L 41/5041* (2013.01); *H04L 41/5096* (2013.01); *H04L 67/00* (2013.01)

(58) Field of Classification Search
  USPC ................................................. 715/734–736
  See application file for complete search history.

(56) References Cited

U.S. PATENT DOCUMENTS

| 8,417,938 | B1  |   | 4/2013  | Considine et al. |
| 8,832,239 | B2  | * | 9/2014  | Assuncao et al. ............ 709/220 |
| 2011/0321045 | A1 | * | 12/2011 | Takemura ............. G06F 9/5077 718/1 |
| 2013/0275975 | A1 | * | 10/2013 | Masuda ................ G06F 9/5077 718/1 |
| 2014/0280966 | A1 | * | 9/2014  | Sapuram ............ G06Q 30/0631 709/226 |

OTHER PUBLICATIONS

Seung-Min Han, Mohammad Mehedi Hassan, Chang-Woo Yoon, Eui-Nam Huh, "Efficient Service Recommendation System for Cloud Computing Market", ICIS'09 Proceedings of the 2nd Internation Conference on Interaction Sciences: Information Technology, Culture and Human, pp. 839-845.*

* cited by examiner

*Primary Examiner* — Jeffrey A Gaffin
*Assistant Examiner* — Nhat-Huy T Nguyen

(57) ABSTRACT

A device, of a cloud computing environment, receives user requirements for the cloud computing environment from user device(s). Each of the user requirements is associated with a corresponding one of the user device(s). The device receives system requirements associated with the cloud computing environment. The system requirements include quality of service (QoS) requirements for computing resources of the cloud computing environment. The device generates proposed arrangement(s) of sets of computing resources, from the computing resources of the cloud computing environment, based on the user requirements and the system requirements. Each of the proposed arrangements is associated with a corresponding one of the user devices. The device provides information associated with the proposed arrangements to the user devices.

20 Claims, 17 Drawing Sheets

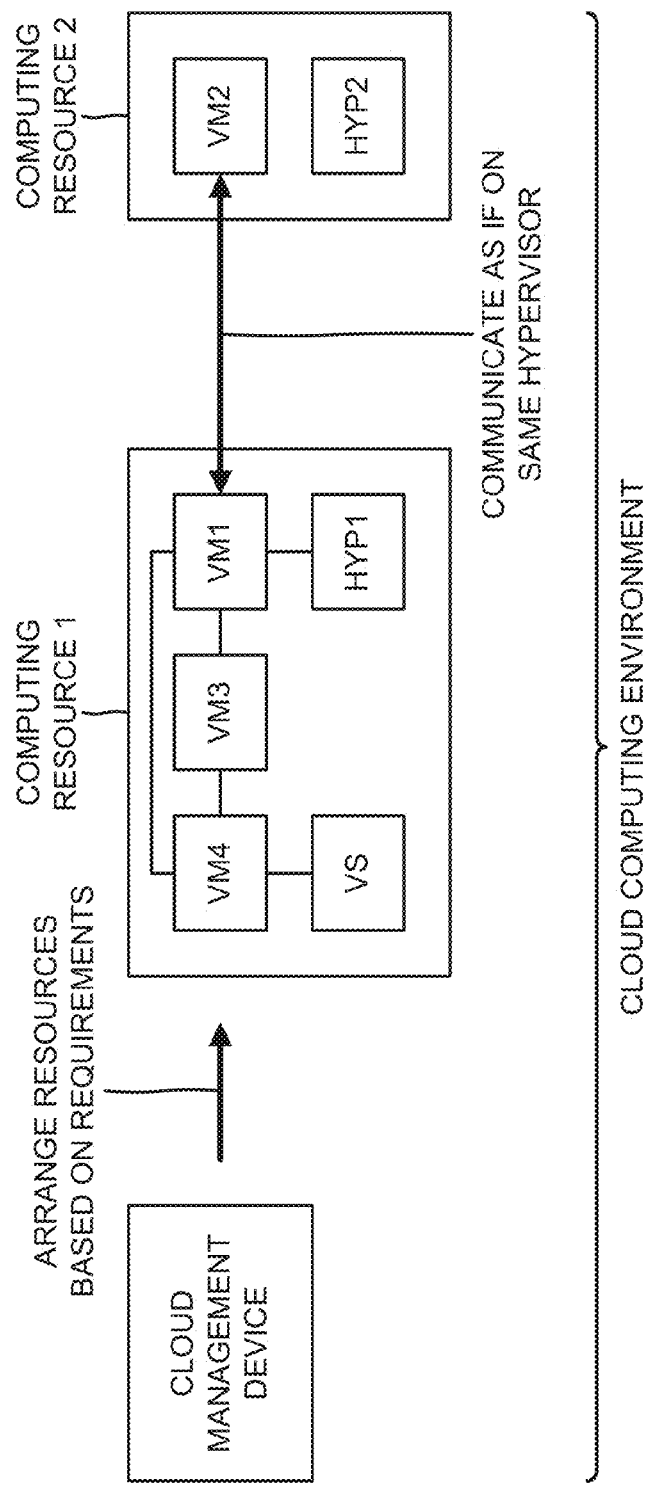

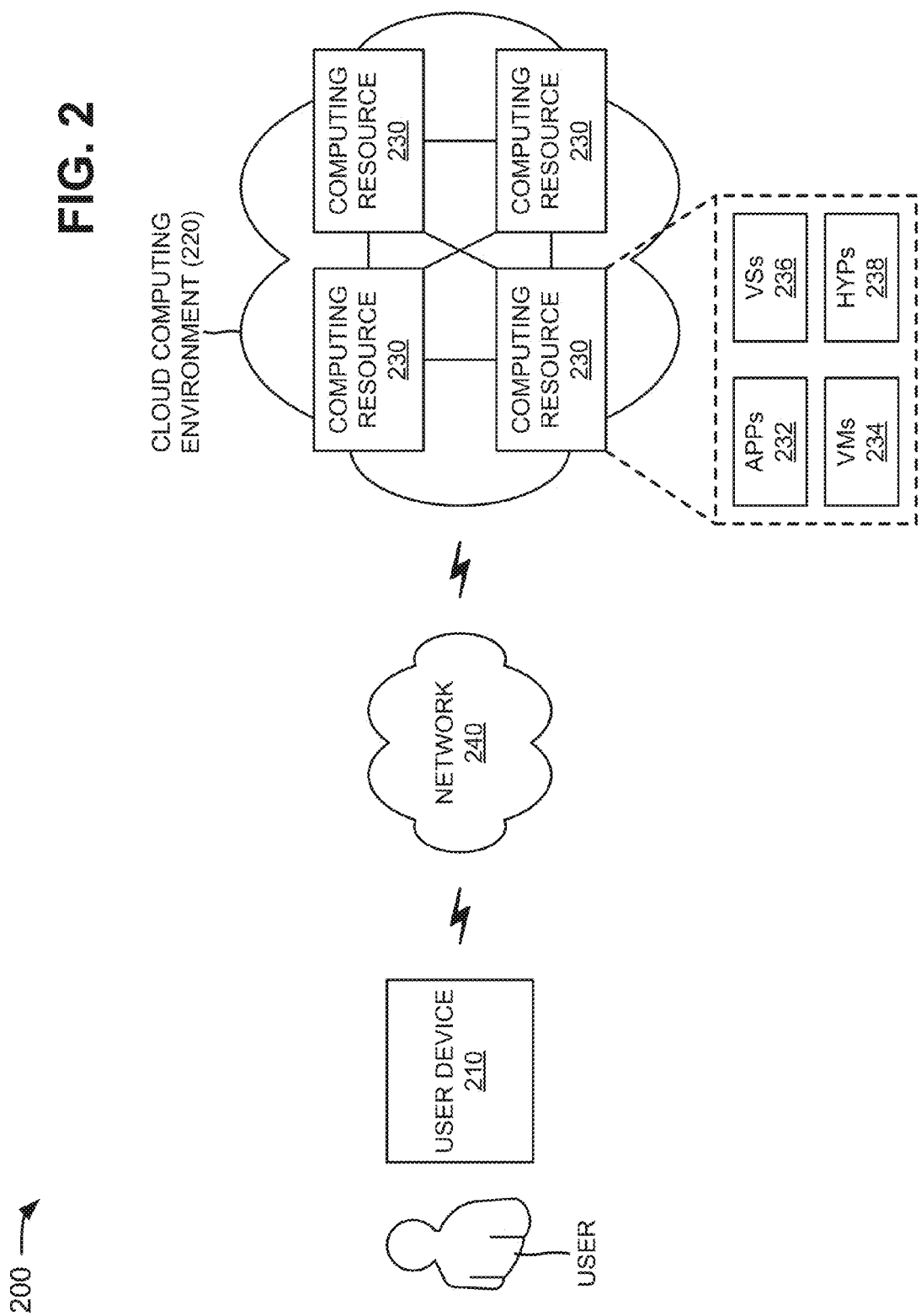

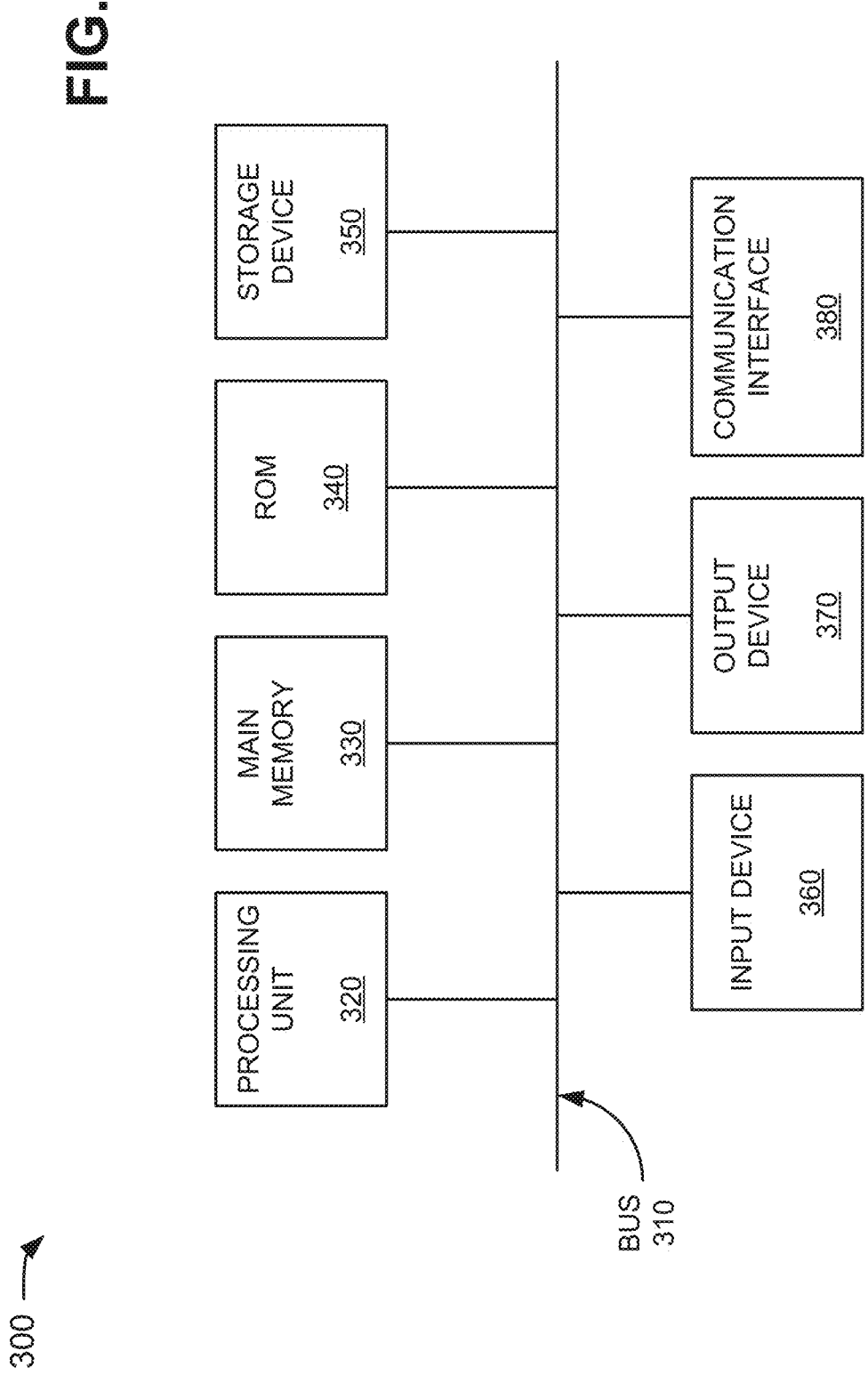

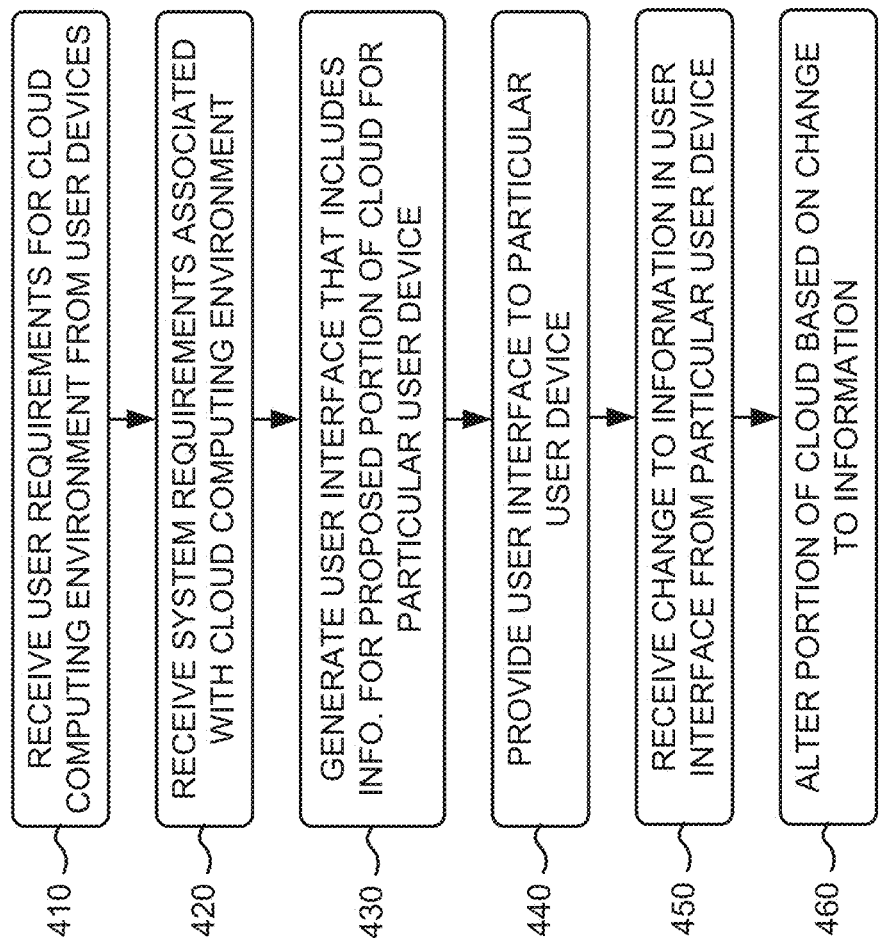

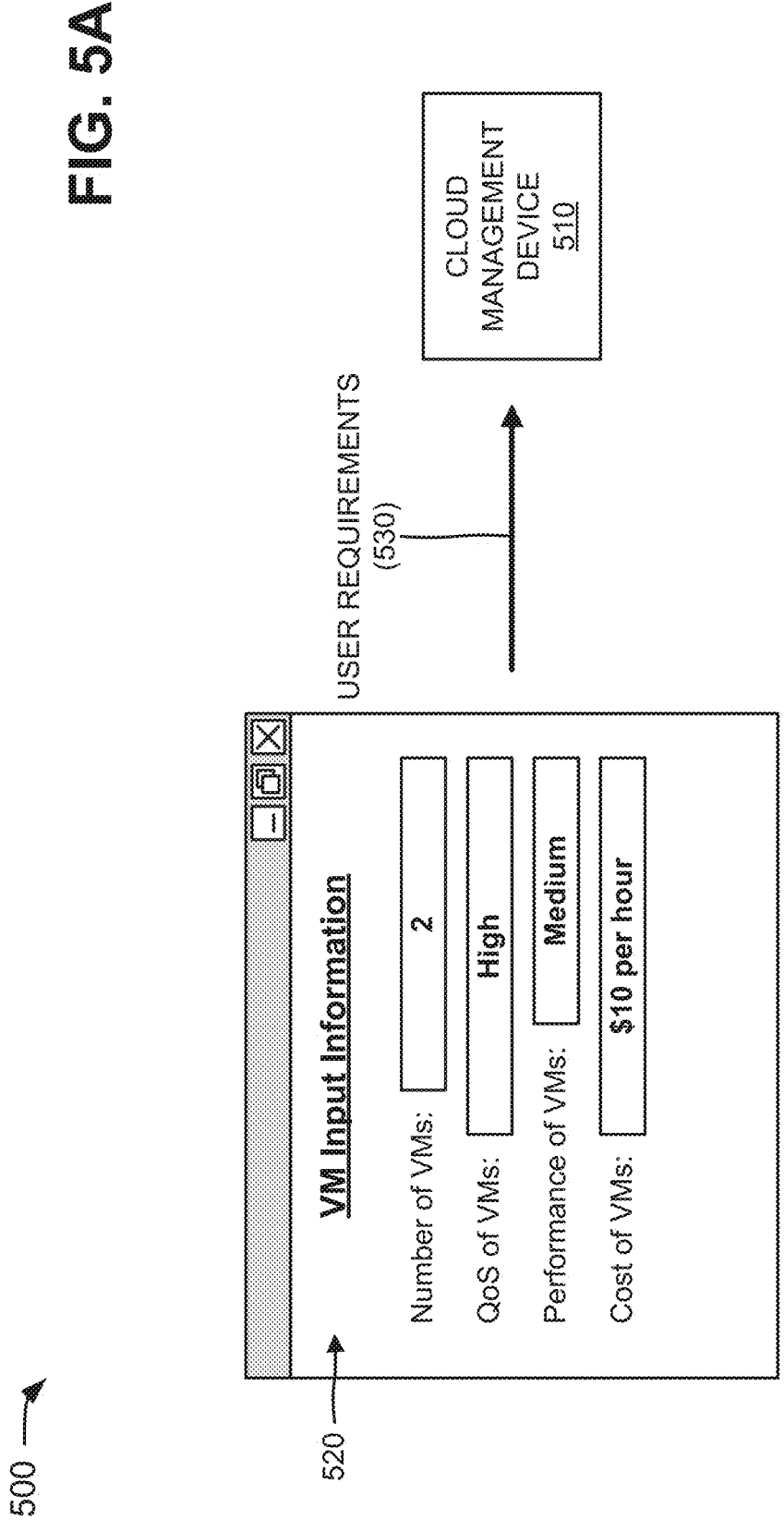

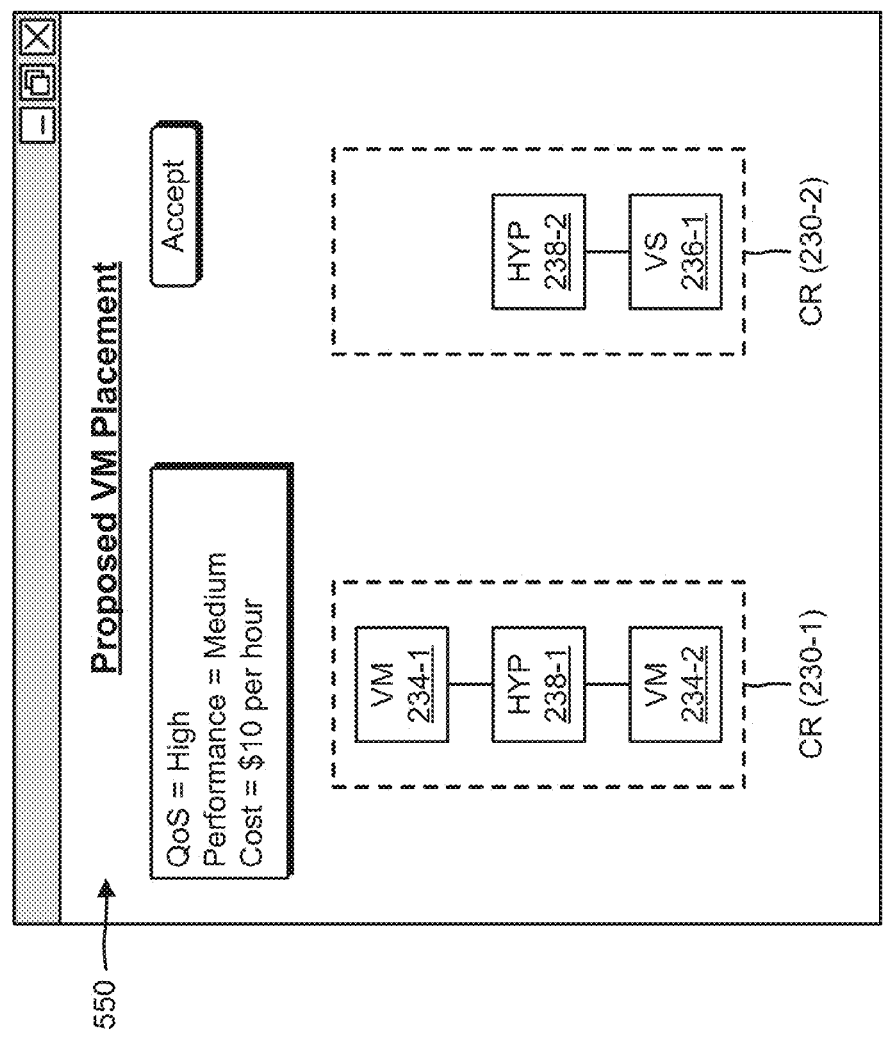

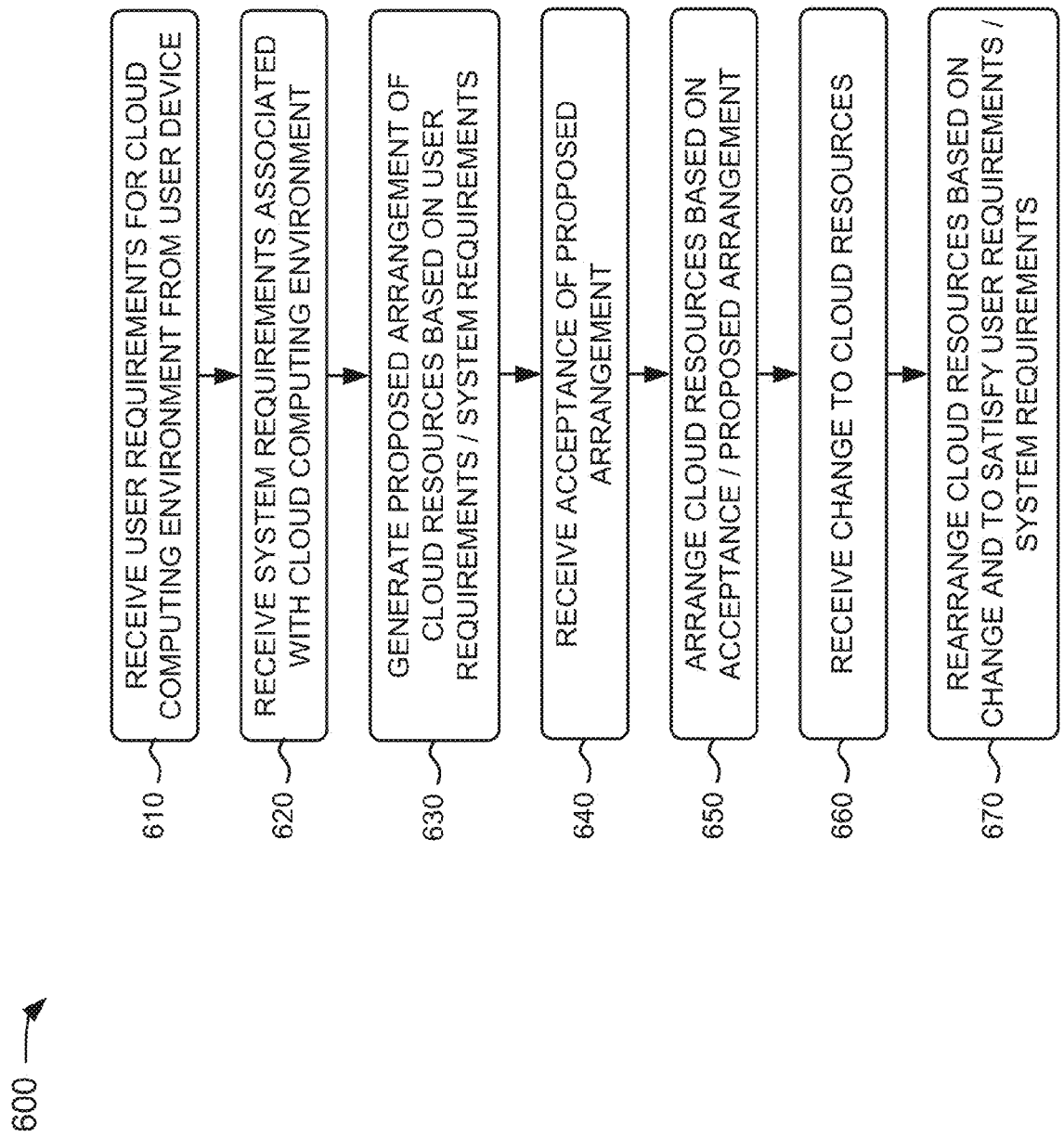

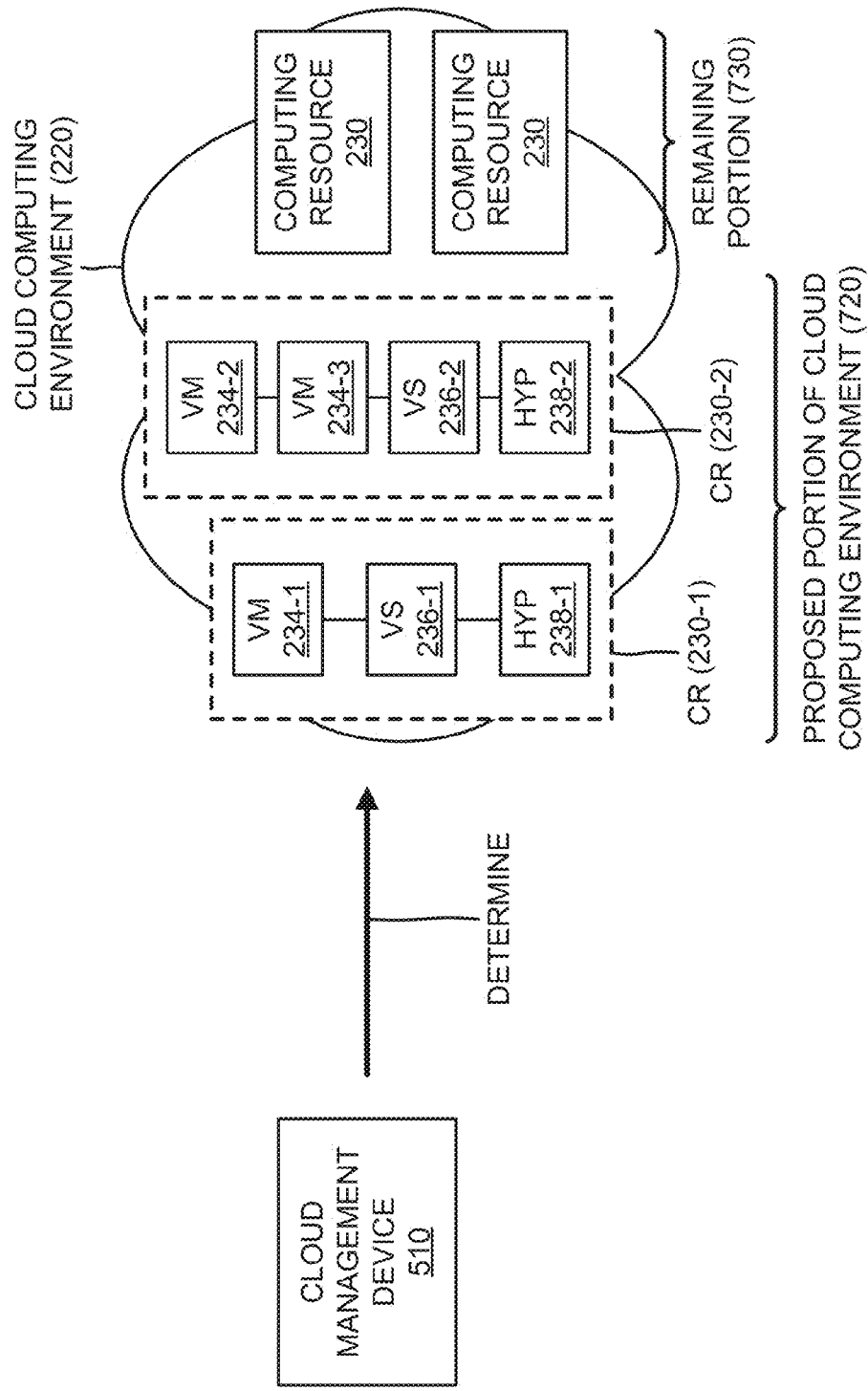

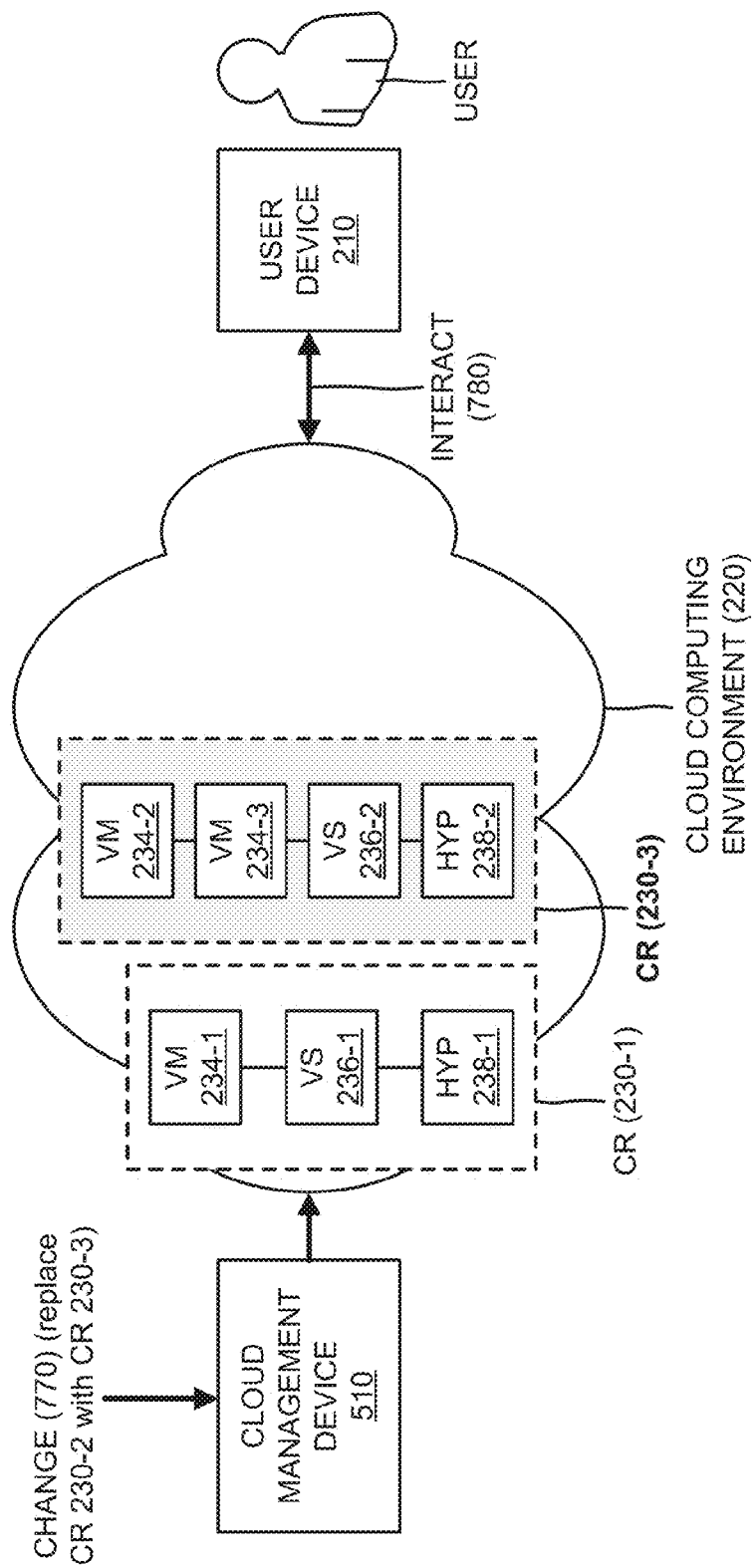

USER DEFINED ARRANGEMENT OF RESOURCES IN A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. One or more users may create one or more VMs in the cloud computing environment. The users may also delete one or more VMs in the cloud computing environment.

BRIEF DESCRIPTION OF THE DRAWINGS

FIGS. 1A and 1B are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for generating a user interface that provides a proposed portion of a cloud computing environment to be utilized by a user;

FIGS. 5A-5F are diagrams of an example of the process described in connection with FIG. 4;

FIG. 6 is a flow chart of an example process for arranging computing resources in a cloud computing environment based on user requirements and system requirements; and FIGS. 7A-7E are diagrams of an example of the process described in connection with FIG. 6.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a quality of service (QoS) to users by automatically rebalancing computing resources, of a cloud computing environment, as VMs are added and deleted by the users. The systems and/or methods may also automatically rebalance the computing resources among the VMs as network resources are added and deleted by a cloud provider. For example, a VM may be migrated in real time to a new computing resource which may eliminate computing resource placement constraints. The systems and/or methods may also enable a user to specify placement of VMs, virtualized storage, hypervisors, etc. (e.g., so that a particular QoS, cost, performance, etc. is achieved) associated with a portion of the cloud computing environment that is dedicated to the user.

Figure 1A:
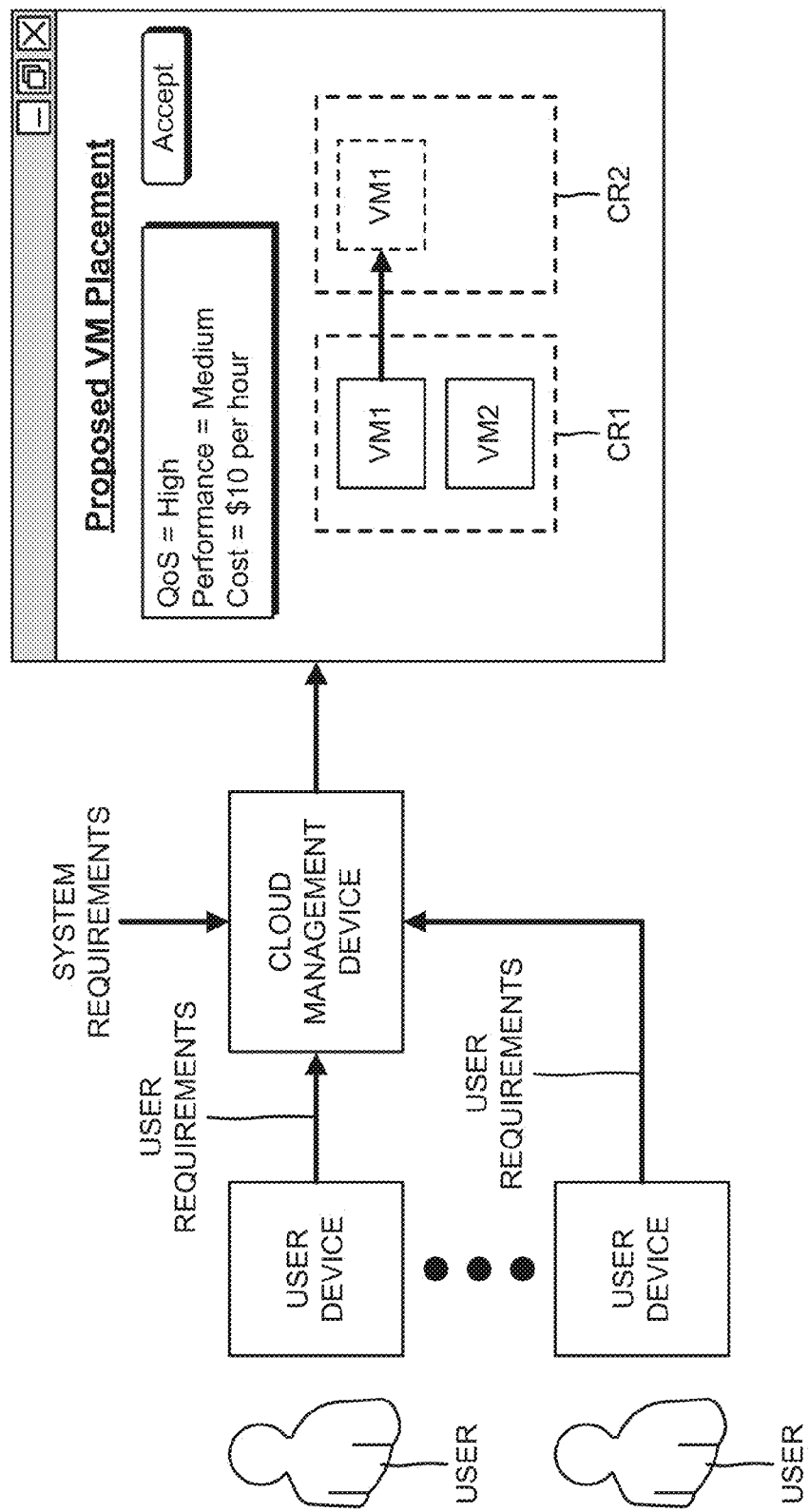

FIGS. 1A and 1B are diagrams of an overview of example implementations described herein. For the overview, assume that a cloud computing environment includes a cloud management device, as shown in FIG. 1A. The cloud management device may manage computing resources of the cloud computing environment. Further assume that that users of the cloud computing environment utilize user devices (e.g., a desktop computer, a tablet computer, etc.) to interact with services, resources, etc. provided by the cloud computing environment (e.g., by VMs). The users may utilize the user devices to provide user requirements to the cloud management device, as further shown in FIG. 1A. The user requirements may include placement of VMs in computing resources (CRs) of the cloud computing environment; placement of virtualized storage in the CRs of the cloud computing environment; a QoS requested by each of the users for the portion of the cloud computing environment utilized by each of the users; a performance requested by each of the users for the portion of the cloud computing environment utilized by each of the users; a cost requested by each of the users for the portion of the cloud computing environment utilized by each of the users; etc.

As further shown in FIG. 1A, the cloud management device may receive system requirements from a system administrator associated with the cloud computing environment. The system requirements may include a QoS requested for the cloud computing environment, a performance requested for the cloud computing environment, network connectivity requirements of the cloud computing environment, a cost requested for the cloud computing environment, etc. The cloud management device may receive the user requirements and the system requirements, and may generate user interfaces based on the user requirements and/or the system requirements.

For example, as shown in FIG. 1A, the cloud management device may generate a user interface that includes information for a proposed portion of the cloud computing environment to be utilized by a particular user device. The user interface may include information specifying a QoS (e.g., High), a performance (e.g., Medium), a cost ($10 per hour), etc. requested by the user of the particular user device; information specifying proposed placement of VMs (e.g., VM1, VM2, etc.) in computing resources (e.g., CR1, CR2, etc.); etc. The cloud management device may provide the user interface to the particular user device, and the particular user device may display the user interface to the user. The user may accept the proposed placement of VMs via the user interface, or may change information provided in the user interface. For example, as shown in FIG. 1A, the user may move the proposed placement of VM1 from CR1 to CR2. The particular user device may provide the change to the cloud management device, and the cloud management device may alter the portion of the cloud computing environment to be utilized by the particular user device based on the change.

With reference to FIG. 1B, the cloud management device may arrange computing resources of the cloud computing environment based on the user requirements, the system requirements, and/or any changes provided by the users of the cloud computing environment. For example, the cloud management device may provide a first VM (e.g., VM1), a third VM (e.g., VM3), a fourth VM (e.g., VM4), a first hypervisor (e.g., HYP1), and virtualized storage (VS) on a first computing resource (e.g., computing resource 1). The cloud management device may provide a second VM (e.g., VM2) and a second hypervisor (e.g., HYP2) on a second computing resource (e.g., computing resource 2). The second VM and second hypervisor may be utilized as a backup system for the first VM and the first hypervisor, and the first VM and the second VM may communicate with each other without affecting speed and performance (e.g., as if the first VM and the second VM shared a hypervisor). In some implementations, the cloud management device may automatically rebalance computing resources, VMs, virtualized storage, etc. when computing resources, VMs, virtualized storage, etc. are added to or removed from the cloud computing environment.

Such an arrangement may enable users of the cloud computing environment to specify requirements, such as QoS, performance, cost, etc., for the portions of the cloud computing environment utilized by the users. The arrangement may also enable the users to specify placement of VMs, virtualized storage, hypervisors, etc. (e.g., so that a particular QoS, cost, performance, etc. is achieved) associated with the portions of the cloud computing environment that are dedicated to the users.

FIG. 2 is a diagram of an example environment 200 in which systems and/or methods described herein may be implemented. As illustrated, environment 200 may include a user device 210 interconnected with a cloud computing environment 220 via a network 240. Components of environment 200 may interconnect via wired connections, wireless connections, or a combination of wired and wireless connections.

User device 210 may include one or more devices that are capable of communicating with cloud computing environment 220 via network 240. For example, user device 210 may include a laptop computer, a personal computer, a tablet computer, a desktop computer, a workstation computer, a smart phone, a personal digital assistant (PDA), and/or other computation and communication devices. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230). Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Network 240 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment

200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for generating a user interface that provides a proposed portion of a cloud computing environment to be utilized by a user. In some implementations, process 400 may be performed by computing resource 230. In some implementations, process 400 may be performed by another device or a group of devices separate from or including computing resource 230.

As shown in FIG. 4, process 400 may include receiving user requirements, for a cloud computing environment, from user devices (block 410). For example, one of computing resources 230 may function as a cloud management device that manages computing resources 230 of cloud computing environment 220. Several users of user devices 210 may subscribe to services, resources, etc. provided by the cloud computing environment (e.g., by VMs 234). In some implementations, the users may utilize user devices 210 to provide user requirements to the cloud management device. The cloud management device may receive the user requirements. The user requirements may include requirements, requested by the users, for portions of cloud computing environment 220 utilized by the users. For example, the user requirements may include placement of VMs 234 in computing resources 230 of cloud computing environment 220; placement of virtualized storage 236 in computing resources 230 of cloud computing environment 220; placement of hypervisors 238 in computing resources 230 of cloud computing environment 220; a QoS requested by each of the users for the portion of cloud computing environment 220 utilized by each of the users; a performance requested by each of the users for the portion of cloud computing environment 220 utilized by each of the users; a cost requested by each of the users for the portion of cloud computing environment 220 utilized by each of the users; etc.

As further shown in FIG. 4, process 400 may include receiving system requirements associated with the cloud computing environment (block 420). For example, the cloud management device may receive system requirements from a system administrator associated with cloud computing environment 220. In some implementations, the system requirements may include requirements for functionality provided by cloud computing environment 220. For example, the system requirements may include a QoS (e.g., a bit rate, a delay, jitter, a packet dropping probability, a bit error rate, etc.) for one or more computing resources 230 of cloud computing environment 220; a performance (e.g., a bit rate per second, bandwidth, etc.) for one or more computing resources 230 of cloud computing environment 220; a cost associated with one or more computing resources 230 of cloud computing environment 220; a QoS, performance, or cost associated with connectivity between one or more computing resources 230 of cloud computing environment 220; etc.

Returning to FIG. 4, process 400 may include generating a user interface that includes information for a proposed portion of the cloud computing environment for a particular user device (block 430). For example, the cloud management device may determine, based on the user requirements and/or the system requirements, a proposed portion of cloud computing environment 220 to be utilized by a particular user device 210. In some implementations, the proposed portion of cloud computing environment 220 may include computing resource(s) 230, VM(s) 234, virtualized storage 236, hypervisor(s) 238, etc. arranged so that some or all of the user requirements (e.g., QoS, performance, cost, etc.) and/or some or all of the system requirements are satisfied. The cloud management device may generate a user interface that includes information associated with the proposed portion of cloud computing environment 220. For example, the user interface may include representations of computing resource(s) 230, VM(s) 234, virtualized storage 236, hypervisor(s) 238, etc. of the proposed portion of cloud computing environment 220.

As further shown in FIG. 4, process 400 may include providing the user interface to the particular user device (block 440). For example, the cloud management device may provide the user interface to the particular user device 210, and the particular user device 210 may display the user interface to a user. The user may interact with the user interface in order to modify or accept the proposed portion of cloud computing environment 220. In some implementations, the cloud management device may provide other user interfaces to other user devices 210 associated with cloud computing environment 220.

Returning to FIG. 4, process 400 may include receiving a change to the information in the user interface from the particular user device (block 450). For example, the user may utilize the particular user device 210 to manipulate the information associated with the proposed portion of cloud computing environment 220. In some implementations, the user may change the information by manipulating (e.g., moving, deleting, etc.) the representations of computing resource(s) 230, VM(s) 234, virtualized storage 236, hypervisor(s) 238, etc. of the proposed portion of cloud computing environment 220. The particular user device 210 may provide the change to the information to the cloud management device, and the cloud management device may receive the change to the information.

As further shown in FIG. 4, process 400 may include altering the proposed portion of the cloud computing environment based on the change to the information (block 460). For example, the cloud management device may modify the proposed portion of cloud computing environment 220 based on the change to the information received from the particular user device 210. In some implementations, the cloud management device may modify one or more computing resources 230, VMs 234, virtualized storage 236, hypervisors 238, etc. of the proposed portion of cloud computing environment 220 based on the change to the information. The cloud management device may arrange computing resource(s) 230, VM(s) 234, virtualized storage 236, hypervisor(s) 238, etc. of the portion of cloud computing environment 220 based on the change to the information. In some implementations, if the user does not modify the proposed portion of cloud computing environment 220, the cloud management device may implement the proposed portion in the cloud computing environment 220.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5B:
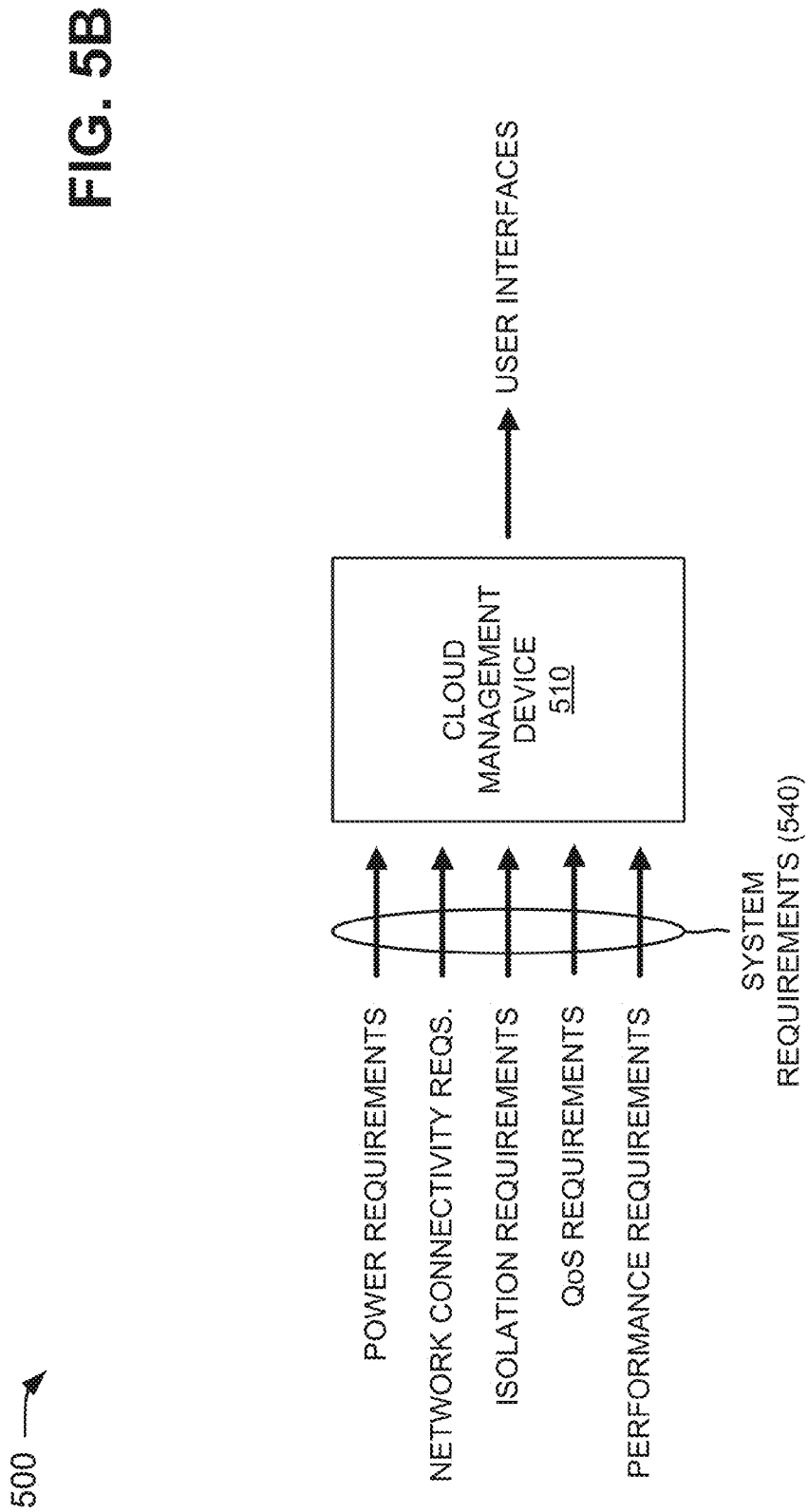

FIGS. 5A-5F are diagrams of an example 500 of the process described above with respect to FIG. 4. In example 500, assume that cloud computing environment 220 includes a cloud management device 510, as shown in FIG. 5A. In some implementations, cloud management device 510 may include one or more computing resources 230 or one or more computation and communication devices separate from computing resources 230. Cloud management device 510 may manage computing resources 230 provided in cloud computing environment 220. In example 500, further assume that cloud management device 510 generates a user interface 520, and provides user interface to user device 210 (not shown in FIG. 5A). User device 210 may display user interface 520 to a user of user device 210.

As shown in FIG. 5A, user interface 520 may include information requesting a number of VMs to be utilized by user device 210, a QoS (e.g., high, medium, low) of the VMs, a performance (e.g., high, medium, low) associated with the VMs, a cost associated with the VMs, etc. In example 500, assume that the user wishes to utilize two (2) VMs, with a high QoS, a medium performance, and a cost of $10 per hour. In some implementations, other information may be provided for the QoS (e.g., a bit rate, a delay, jitter, a packet dropping probability, a bit error rate, etc.), the performance (e.g., a bandwidth, a bit rate per second, etc.), the cost, etc. In some implementations, user interface 520 may request information associated with computing resources 230, virtualized storage 236, hypervisors 238, etc. to be utilized by user device 210. The information provided to user interface 520 may be referred to as user requirements 530. As further shown in FIG. 5A, user requirements 530 may be provided to cloud management device 510, and cloud management device 510 may receive user requirements 530.

As shown in FIG. 5B, cloud management device 510 may receive system requirements 540 from, for example, a system administrator of cloud computing environment 220. System requirements 540 may include power requirements for one or more computing resources 230 of cloud computing environment 220; network connectivity requirements (e.g., a QoS, performance, or cost associated with connectivity) for one or more computing resources 230 of cloud computing environment 220; isolation requirements (e.g., backup systems, disaster recovery systems, etc.) for one or more computing resources 230 of cloud computing environment 220; QoS requirements (e.g., a bit rate, a delay, jitter, a packet dropping probability, a bit error rate, etc.) for one or more computing resources 230 of cloud computing environment 220; performance requirements (e.g., a bit rate per second, bandwidth, etc.) for one or more computing resources 230 of cloud computing environment 220; etc. Cloud management device 510 may generate one or more user interfaces based on user requirements 530 and/or system requirements 540, as further shown in FIG. 5B. The user interfaces may include information associated with a proposed portion of cloud computing environment 220 to be utilized by user device 210.

For example, the user interfaces may include a user interface 550 as shown in FIG. 5C. User interface 550 may include information associated with the proposed portion of cloud computing environment 220 to be utilized by user device 210. For example, user interface 550 may include representations of computing resources, VMs, etc. provided in the proposed portion of cloud computing environment 220. The proposed portion may include a first computing resource (CR) 230-1 and a second computing resource 230-2. The first computing resource 230-1 may include a first VM 234-1, a second VM 234-2, and a first hypervisor 238-1. The second computing resource 230-2 may include a first virtualized storage 236-1 and a second hypervisor 238-2. User interface 550 may include the information provided by the user via user interface 520 (FIG. 5A). For example, user interface 550 may include the proposed portion of cloud computing environment 220 with a high QoS, a medium performance, and a cost of $10 per hour. As further shown in FIG. 5C, user interface 550 may include a mechanism (e.g., an "Accept" button, link, icon, etc.) that, when selected, may indicate that the user accepts the proposed portion of cloud computing environment 220.

If the user does not accept the proposed portion of cloud computing environment 220, the user may modify the information provided in user interface 550. For example, the user may move the second VM 234-2 from the first computing resource 230-1 to the second computing resource 230-2, as shown in a user interface 560 of FIG. 5D. In some implementations, the user may move the second VM 234-2 if the user wishes to utilize the second VM 234-2 as a backup VM to the first VM 234-1 or if the user wishes the second VM 234-2 to be physically closer to the first virtualized storage 236-1. As further shown in FIG. 5D, moving the second VM 234-2 may not affect the QoS (e.g., the QoS may remain high) or the performance (e.g., the performance may remain medium), but may increase the cost (e.g., from $10 per hour to $12 per hour) of the proposed portion of cloud computing environment 220. After moving the second VM 234-2, the user may select the "Accept" mechanism to indicate that the user accepts the proposed portion of cloud computing environment 220.

Figure 5D:
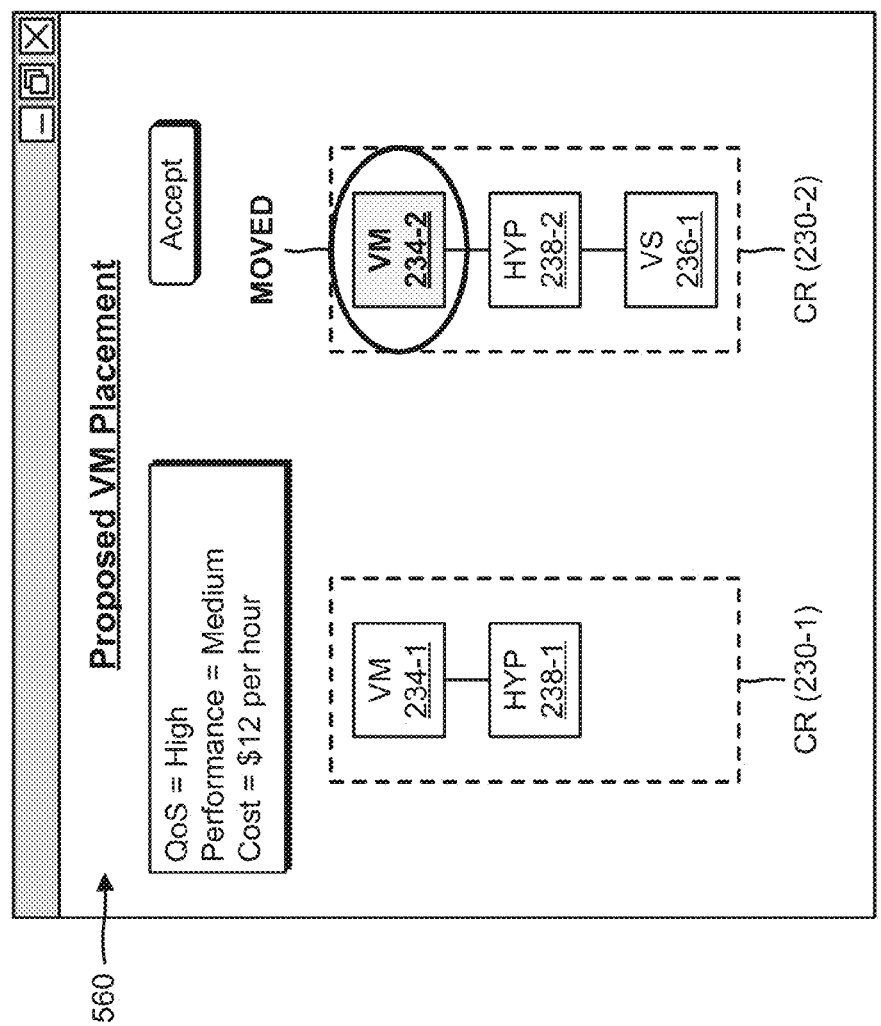
Figure 5E:
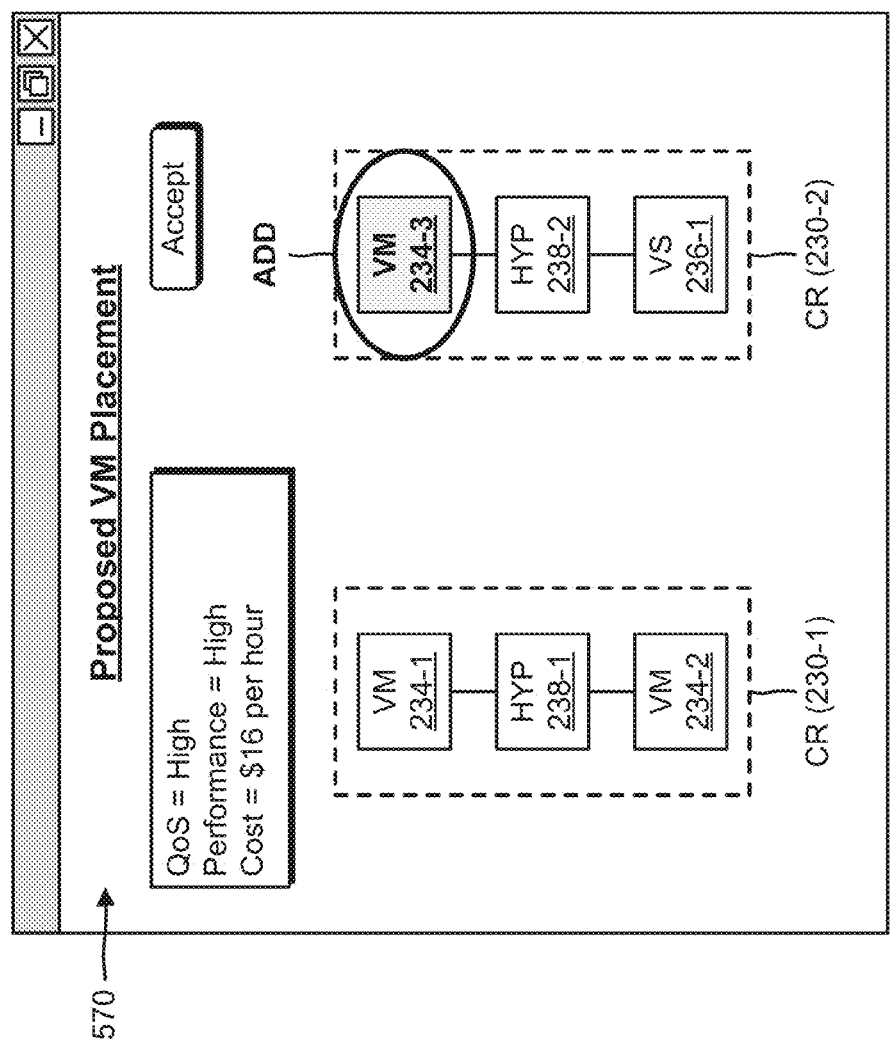

In some implementations, and as shown in a user interface 570 of FIG. 5E, the user may keep the second VM 234-2 in the first computing resource 230-1 and may add a third VM 234-3 to the second computing resource 230-2. The user may add the third VM 234-3 if the user wishes to utilize the third VM 234-3 as a backup VM to the first VM 234-1 or the second VM 234-2, or if the user wishes to provide the third VM 234-3 physically close to the first virtualized storage 236-1. As further shown in FIG. 5E, adding the third VM 234-3 may not affect the QoS (e.g., the QoS may remain high), but may increase the performance (e.g., from medium to high) and may increase the cost (e.g., from $10 per hour to $16 per hour) of the proposed portion of cloud computing environment 220. After adding the third VM 234-3, the user may select the "Accept" mechanism to indicate that the user accepts the proposed portion of cloud computing environment 220.

In some implementations, the user may utilize user interfaces 550-570 to select a specific QoS, performance, cost, VM arrangement, etc. For example, the QoS and performance may increase and the cost may decrease if the user's VMs 234 are all located on a particular computing resource 230 since VMs 234 may communicate quickly with each other (e.g., no latency in communications). However, if the particular computing resource 230 becomes unavailable, the user may not have access to any of the user's VMs 234. Thus, the user may wish to provide one or more VMs 234 in a separate computing resource 230 for backup purposes. Providing one or more VMs 234 in a separate computing resource 230 may decrease the QoS and performance (e.g., due to latency in communications) and may increase the cost (e.g., due to utilizing additional computing resources 230).

Figure 5F:
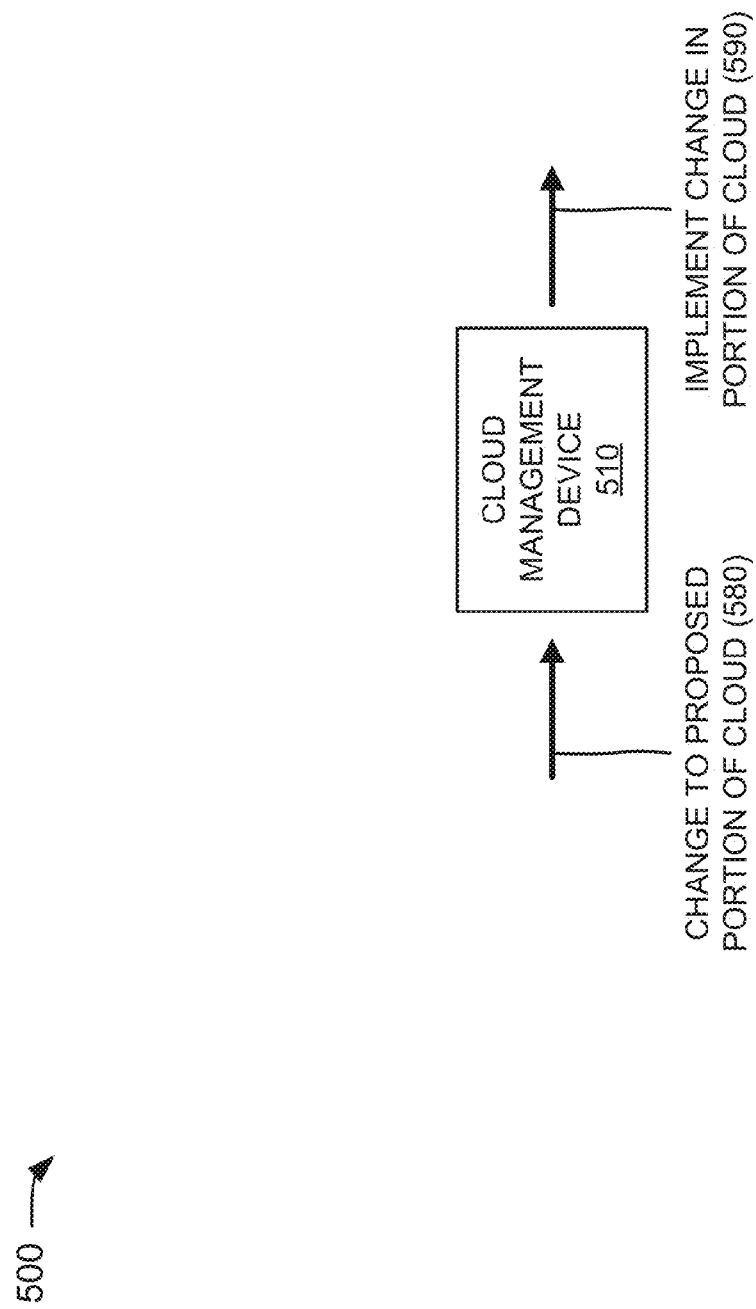

If the user modifies the proposed portion of cloud computing environment 220, as shown in FIGS. 5D and 5E, user device 210 may generate a change 580 to the proposed portion of cloud computing environment 220. User device 210 may provide change 580 to cloud management device 510, and cloud management device 510 may receive change 580, as shown in FIG. 5F. Cloud management device 510 may modify the proposed portion of cloud computing environment 220 based on change 580. In some implementations, cloud management device 510 may modify one or more computing resources 230, VMs 234, virtualized storage 236, hypervisors 238, etc. of the proposed portion of cloud computing environment 220 based on change 580. Cloud management device 510 may implement change 580 in the portion of cloud computing environment 220, as indicated by reference number 590 in FIG. 5F. In some implementations, if the user does not modify the proposed portion of cloud computing environment 220, cloud management device 510 may implement the proposed portion in the cloud computing environment 220.

As indicated above, FIGS. 5A-5F are provided merely as an example. Other examples are possible and may differ from what was described with regard to FIGS. 5A-5F.

FIG. 6 is a flow chart of an example process 600 for arranging computing resources in a cloud computing environment based on user requirements and system requirements. In some implementations, process 600 may be performed by computing resource 230. In some implementations, process 600 may be performed by another device or a group of devices (e.g., cloud network device 520) separate from or including computing resource 230.

As shown in FIG. 6, process 600 may include receiving user requirements for a cloud computing environment from a user device (block 610). For example, a user of user device 210 may subscribe to services, resources, etc. provided by cloud computing environment 220 (e.g., by VMs 234). In some implementations, the user may utilize user device 210 to provide user requirements to cloud management device 510. Cloud management device 510 may receive the user requirements from user device 210. The user requirements may include requirements, requested by the user, for a portion of cloud computing environment 220 utilized by the user. For example, the user requirements may include placement of VM(s) 234 in computing resource(s) 230 of cloud computing environment 220; placement of virtualized storage 236 in computing resource(s) 230 of cloud computing environment 220; placement of hypervisor(s) 238 in computing resource(s) 230 of cloud computing environment 220; a QoS requested by the user for the portion of cloud computing environment 220; a performance requested by the user for the portion of cloud computing environment 220; a cost requested by the user for the portion of cloud computing environment 220; etc.

As further shown in FIG. 6, process 600 may include receiving system requirements associated with the cloud computing environment (block 620). For example, cloud management device 510 may receive system requirements from a system administrator associated with cloud computing environment 220. In some implementations, the system requirements may include requirements for functionality provided by cloud computing environment 220. For example, the system requirements may include a QoS for one or more computing resources 230 of cloud computing environment 220; a performance for one or more computing resources 230 of cloud computing environment 220; a cost associated with one or more computing resources 230 of cloud computing environment 220; a QoS, performance, or cost associated with connectivity between one or more computing resources 230 of cloud computing environment 220; etc.

Returning to FIG. 6, process 600 may include generating a proposed arrangement of cloud resources based on the user requirements and/or the system requirements (block 630). For example, cloud management device 510 may determine, based on the user requirements and/or the system requirements, a proposed portion of cloud computing environment 220 to be utilized by user device 210. In some implementations, the proposed portion of cloud computing environment 220 may include computing resource(s) 230, VM(s) 234, virtualized storage 236, hypervisor(s) 238, etc. arranged so that some or all of the user requirements (e.g., QoS, performance, cost, etc.) and/or some or all of the system requirements are satisfied. Cloud management device 510 may generate a user interface that includes information associated with the proposed portion of cloud computing environment 220. For example, the user interface may include representations of computing resource(s) 230, VM(s) 234, virtualized storage 236, hypervisor(s) 238, etc. of the proposed portion of cloud computing environment 220. Cloud management device 510 may provide the user interface to user device 210, and user device 210 may display the user interface to the user.

As further shown in FIG. 6, process 600 may include receiving acceptance of the proposed arrangement (block 640). For example, the user may utilize user device 210 to accept the proposed portion of cloud computing environment 220. In some implementations, the user may select, from the user interface, a mechanism that indicates that the user accepts the proposed portion of cloud computing environment 220. User device 210 may provide the acceptance of the proposed portion to cloud management device 510, and cloud management device 510 may receive the acceptance.

Returning to FIG. 6, process 600 may include arranging the cloud resources based on the acceptance and based on the proposed arrangement (block 650). For example, cloud management device 510 may arrange computing resource(s) 230, VM(s) 234, virtualized storage 236, hypervisor(s) 238, etc. of the proposed portion of cloud computing environment 220 based on the user's acceptance of the proposed portion. In some implementations, cloud management device 510 may arrange computing resource(s) 230, VM(s) 234, virtualized storage 236, hypervisor(s) 238, etc. of the proposed portion so that some or all of the user requirements (e.g., QoS, performance, cost, etc.) and/or some or all of the system requirements are satisfied.

As further shown in FIG. 6, process 600 may include receiving a change to the cloud resources of the proposed arrangement (block 660). For example, the user of user device 210 may modify the proposed portion of cloud computing environment 220 at any time. In some implementations, the user may change the proposed portion by manipulating (e.g., moving, deleting, etc.) the representations of computing resource(s) 230, VM(s) 234, virtualized storage 236, hypervisor(s) 238, etc. of the proposed portion of cloud computing environment 220. User device 210 may provide the change to cloud management device 510, and cloud management device 510 may receive the change.

Returning to FIG. 6, process 600 may include rearranging the cloud resources based on the change and to satisfy the user requirements and/or the system requirements (block 670). For example, cloud management device 510 may rearrange the proposed portion of cloud computing environment 220 based on the change received from user device 210. In some implementations, cloud management device 510 may rearrange one or more computing resources 230, VMs 234, virtualized storage 236, hypervisors 238, etc. of the proposed portion of cloud computing environment 220 based on the change. Cloud management device 510 may rearrange computing resource(s) 230, VM(s) 234, virtualized storage 236, hypervisor(s) 238, etc. of the portion of cloud computing environment 220 so that some or all of the user requirements (e.g., QoS, performance, cost, etc.) and/or some or all of the system requirements are satisfied.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
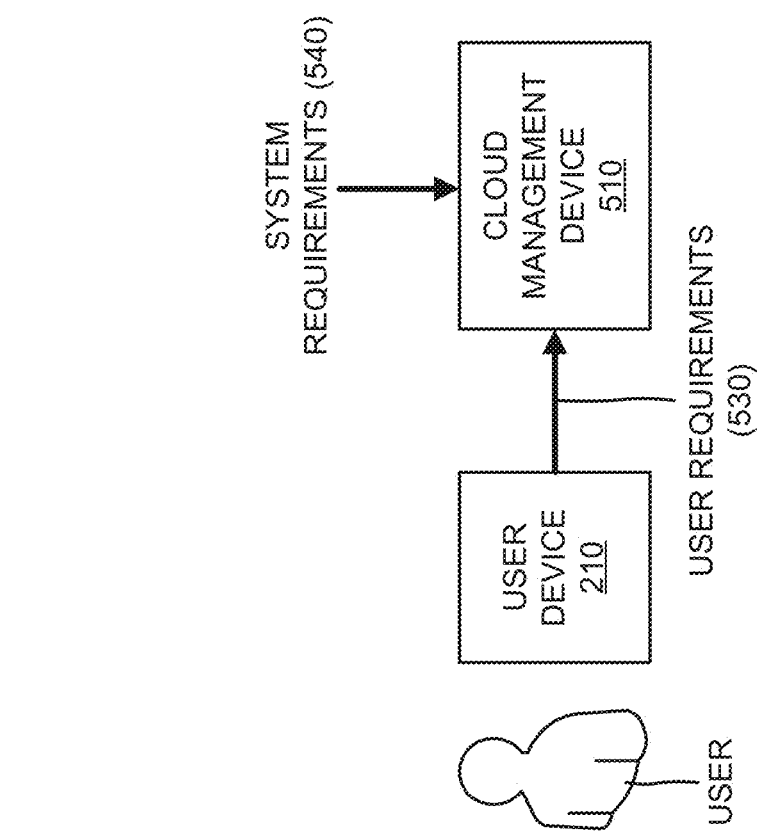

FIGS. 7A-7E are diagrams of an example 700 of the process described above with respect to FIG. 6. In example 700, assume that a user associated with user device 210 wishes to provide user requirements 530 (FIG. 5A) to cloud management device 510. In some implementations, user device 210 may utilize user interface 520 (FIG. 5A) to provide user requirements 530 to cloud management device 510. User requirements 530 may include requirements, requested by the user, for a portion of cloud computing environment 220 utilized by the user. As shown in FIG. 7A, user requirements 530 may be provided to cloud management device 510, and cloud management device 510 may receive user requirements 530. As further shown in FIG. 7A, cloud management device 510 may receive system requirements 540 (FIG. 5B) from a system administrator associated with cloud computing environment 220. In some implementations, system requirements 540 may include requirements for functionality provided by cloud computing environment 220.

Cloud management device 510 may determine, based on user requirements 530 and/or system requirements 540, a proposed portion 720 of cloud computing environment 220 to be utilized by user device 210, as shown in FIG. 7B. In some implementations, proposed portion 720 of cloud computing environment 220 may include computing resource(s) 230, VM(s) 234, virtualized storage 236, hypervisor(s) 238, etc. arranged so that some or all of user requirements 530 and/or some or all of system requirements 540 are satisfied. For example, as further shown in FIG. 7B, proposed portion 720 may include a first computing resource 230-1 and a second computing resource 230-2. The first computing resource 230-1 may include a first VM 234-1, a first virtualized storage 236-1, and a first hypervisor 238-1. The second computing resource 230-2 may include a second VM 234-2, a third VM 234-3, a second virtualized storage 236-2, and a second hypervisor 238-2. As further shown in FIG. 7B, a remaining portion 730 of cloud computing environment 220 may include computing resources 230 not utilized by user device 210.

Figure 7C:
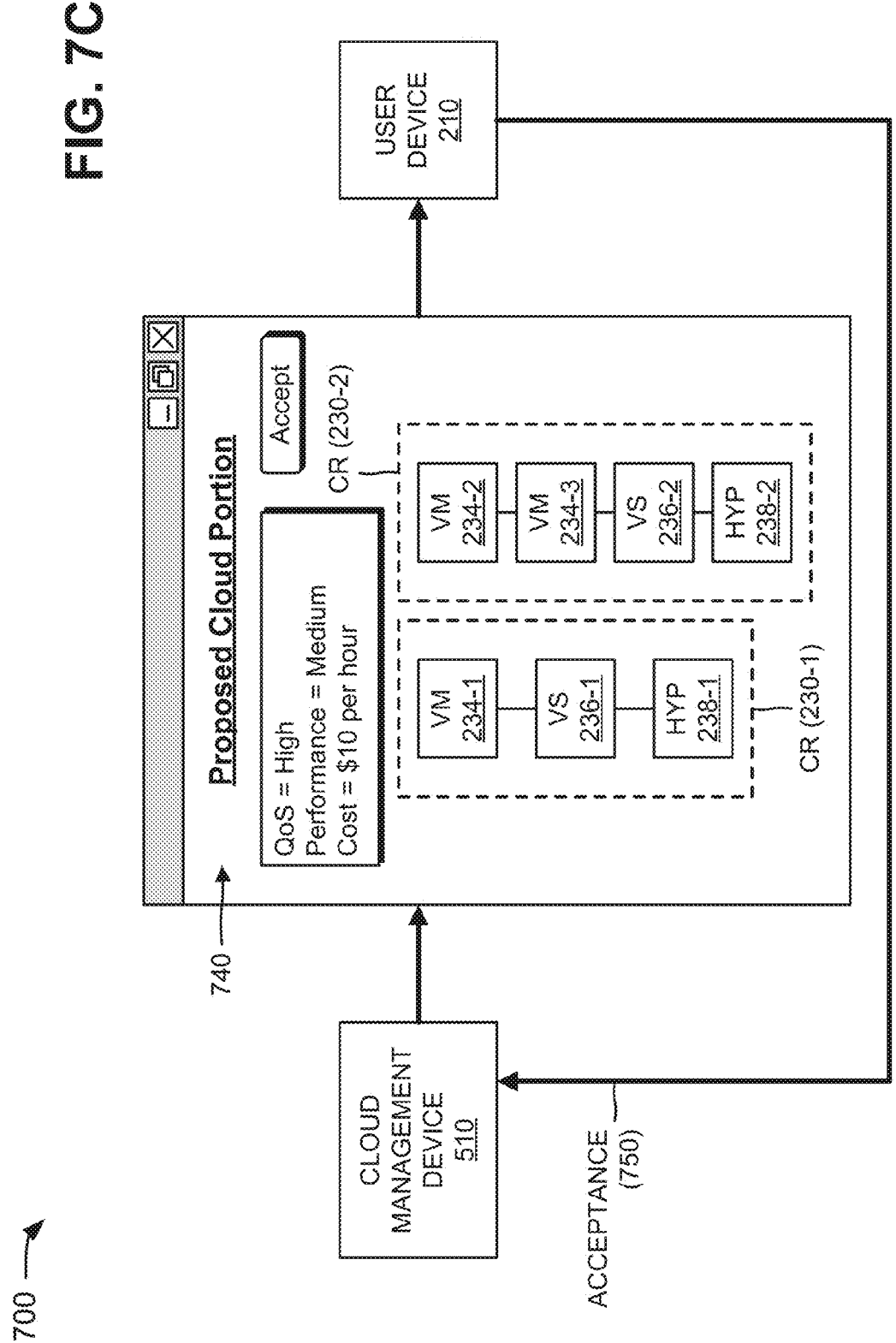

Cloud management device 510 may generate a user interface 740 that includes information associated with proposed portion 720 of cloud computing environment 220. For example, as shown in FIG. 7C, user interface 740 may include representations of the first computing resource 230-1, the second computing resource 230-2, the first VM 234-1, the second VM 234-2, the third VM 234-3, the first virtualized storage 236-1, the second virtualized storage 236-3, the first hypervisor 238-1, and the second hypervisor 238-3. User interface 740 may also include may include information associated with a QoS (e.g., high) of proposed portion 720, a performance (e.g., medium) of proposed portion 720, and a cost (e.g., $10 per hour) associated with proposed portion 720. User interface 740 may include a mechanism (e.g., an "Accept" button, link, icon, etc.) that, when selected, may indicate that the user accepts proposed portion 720 of cloud computing environment 220.

As further shown in FIG. 7C, cloud management device 510 may provide user interface 740 to user device 210, and user device 210 may display user interface 740 to the user. If the user selects the "Accept" mechanism, user device 210 may provide an acceptance 750 of proposed portion 720 to cloud management device 510. Cloud management device 510 may receive acceptance 750. Cloud management device 510 may arrange computing resource(s) 230, VM(s) 234, virtualized storage 236, hypervisor(s) 238, etc. of proposed portion 720 of cloud computing environment 220 based on acceptance 750.

Figure 7D:
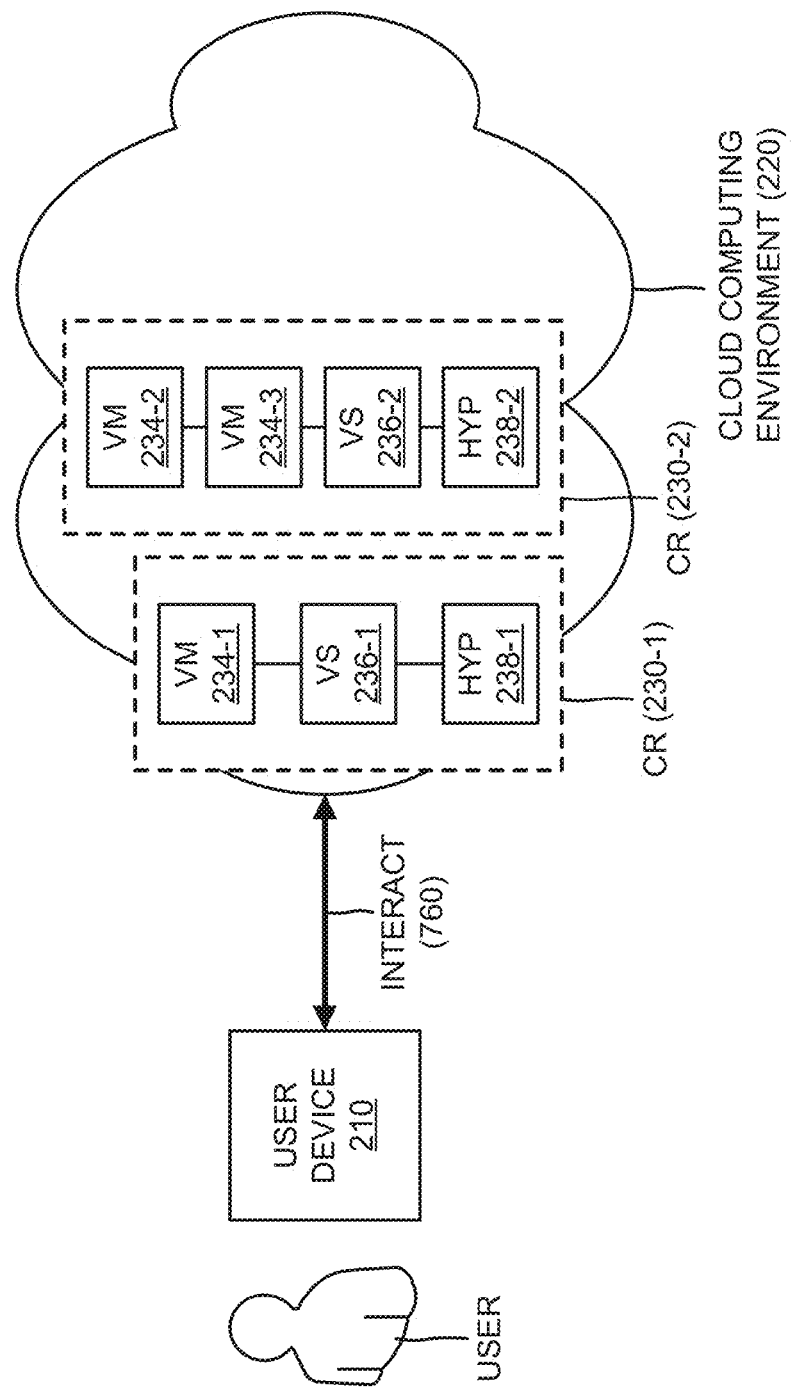

In some implementations, cloud management device 510 may make proposed portion 720 of cloud computing environment 220 available to the user via user device 210. As shown in FIG. 7D, the user may utilize user device 210 to interact 760 with proposed portion 720 of cloud computing environment 220. For example, user device 210 may interact with the first VM 234-1 in order to receive a service provided by the first VM 234-1. In some implementations, user device 210 may interact with the second virtualized storage 236-2 in order to store information in the second virtualized storage 236-2.

In some implementations, cloud management device 510 may change proposed portion of cloud computing environment 220. For example, as shown in FIG. 7E, cloud management device 510 may replace the second computing resource 230-2 with a third computing resource 230-3, as indicated by reference number 770. In some implementations, the second computing resource 230-2 may be replaced with the third computing resource 230-3 because the second computing resource 230-2 has become inoperable. As further shown in FIG. 7E, cloud management device 510 may move the second VM 234-2, the third VM 234-3, the second virtualized storage 236-2, and the second hypervisor 238-2 to the third computing resource 230-3. As further shown in FIG. 7E, the user may utilize user device 210 to interact 780 with the modified proposed portion 720 of cloud computing environment 220. For example, user device 210 may interact with the second VM 234-1 in order to receive a service provided by the second VM 234-1.

As indicated above, FIGS. 7A-7E are provided merely as an example. Other examples are possible and may differ from what was described with regard to FIGS. 7A-7E.

Systems and/or methods described herein may provide a QoS to users by automatically rebalancing computing resources, of a cloud computing environment, as VMs are added and deleted by the users. The systems and/or methods may also automatically rebalance the computing resources among the VMs as network resources are added and deleted by a cloud provider. For example, a VM may be migrated in real time to a new computing resource which may eliminate computing resource placement constraints. The systems and/or methods may also enable a user to specify placement of VMs, virtualized storage, hypervisors, etc. (e.g., so that a particular QoS, cost, performance, etc. is achieved) associated with a portion of the cloud computing environment that is dedicated to the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

As used herein, the term "user" is intended to be broadly interpreted to include a user device, or a user of a user device.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a user device (e.g., via a touch screen display, a mouse, a keyboard, a keypad, voice commands, etc.).

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by a device of a cloud computing environment, user requirements for the cloud computing environment,
        the user requirements being received from one or more user devices,
        each of the user requirements being particular to a user of the one or more user devices, and
        each of the user requirements being associated with a corresponding one of the one or more user devices;
    receiving, by the device, system requirements associated with the cloud computing environment,
        the system requirements including quality of service (QoS) requirements for computing resources of the cloud computing environment;
    generating, by the device, one or more proposed arrangements of sets of computing resources, from the computing resources of the cloud computing environment, based on the user requirements and the system requirements, each of the one or more proposed arrangements being associated with a corresponding one of the one or more user devices, each of the one or more proposed arrangements including at least a computing resource, a virtual machine, virtualized storage, and a hypervisor, of the cloud computing environment, arranged so that at least a portion of the user requirements and at least a portion of the system requirements are satisfied;

providing, by the device, information associated with the one or more proposed arrangements to the one or more user devices;

receiving, by the device, a change to a particular proposed arrangement, of the one or more proposed arrangements, from a particular user device of the one or more user devices;

implementing, by the device, the change to the particular proposed arrangement in the cloud computing environment to generate an updated proposed arrangement, the change to the particular proposed arrangement including a change to an arrangement of particular computing resources and particular virtual machines associated with the particular proposed arrangement;

providing, by the device, the updated proposed arrangement to the particular user device; and rebalancing, automatically by the device, the computing resources of the cloud computing environment based on the user requirements and the system requirements.

2. The method of claim 1, further comprising:
generating a user interface that includes information associated with the particular proposed arrangement associated with the particular user device; and
providing the user interface to the particular user device.

3. The method of claim 1, further comprising:
receiving, via a user interface, an indication of acceptance of the updated proposed arrangement from the particular user device; and
implementing the updated proposed arrangement in the cloud computing environment based on the indication of acceptance.

4. The method of claim 1, where the change to the particular proposed arrangement is received via a user interface.

5. The method of claim 1, where each of the user requirements includes at least one of:
placement of virtual machines, virtualized storage, or hypervisors in the computing resources of the cloud computing environment,
quality of service (QoS) requirements requested by each of the one or more user devices,
performance requirements requested by each of the one or more user devices, or
cost requirements requested by each of the one or more user devices.

6. The method of claim 1, where the information associated with the one or more proposed arrangements includes user interfaces providing representations of the sets of computing resources.

7. The method of claim 1, where the information associated with the one or more proposed arrangements includes at least one of:
quality of service (QoS) requirements requested by each of the one or more user devices,
performance requirements requested by each of the one or more user devices, or
cost requirements requested by each of the one or more user devices.

8. A device of a cloud computing environment, the device comprising:
one or more processors to:
receive user requirements for the cloud computing environment,
the user requirements being received from one or more user devices,
each of the user requirements being particular to a user of the one or more user devices, and
each of the user requirements being associated with a corresponding one of the one or more user devices,
receive system requirements associated with the cloud computing environment,
the system requirements including quality of service (QoS) requirements for computing resources of the cloud computing environment,
generate one or more proposed arrangements of sets of computing resources, from the computing resources of the cloud computing environment, based on the user requirements and the system requirements,
each of the one or more proposed arrangements being associated with a corresponding one of the one or more user devices,
a proposed arrangement, of the one or more proposed arrangements, including at least a computing resource, a virtual machine, virtualized storage, and a hypervisor, of the cloud computing environment, arranged so that at least a portion of the user requirements and at least a portion of the system requirements are satisfied,
provide information associated with the one or more proposed arrangements to the one or more user devices,
receive a change to a particular proposed arrangement, of the one or more proposed arrangements, from a particular user device of the one or more user devices,
implement the change to the particular proposed arrangement in the cloud computing environment to generate an updated proposed arrangement,
the change to the particular proposed arrangement including a change to an arrangement of particular computing resources and particular virtual machines associated with the particular proposed arrangement,
provide the updated proposed arrangement to the particular user device, and
rebalance, automatically, the computing resources of the cloud computing environment based on the user requirements and the system requirements.

9. The device of claim 8, where the one or more processors are further to:
generate a user interface that includes information associated with the particular proposed arrangement associated with the particular user device, and
provide the user interface to the particular user device.

10. The device of claim 8, where the one or more processors are further to:
receive, via a user interface, an indication of acceptance of the updated proposed arrangement from the particular user device, and
implement the updated proposed arrangement in the cloud computing environment based on the indication of acceptance.

11. The device of claim 8, where the change to the particular proposed arrangement is received via a user interface.

12. The device of claim 8, where each of the user requirements includes at least one of:
placement of virtual machines, virtualized storage, or hypervisors in the computing resources of the cloud computing environment,
quality of service (QoS) requirements requested by each of the one or more user devices,
performance requirements requested by each of the one or more user devices, or
cost requirements requested by each of the one or more user devices.

13. The device of claim 8, where the information associated with the one or more proposed arrangements includes user interfaces providing representations of the sets of computing resources.

14. The device of claim 8, where the information associated with the one or more proposed arrangements includes at least one of:
quality of service (QoS) requirements requested by each of the one or more user devices,
performance requirements requested by each of the one or more user devices, or
cost requirements requested by each of the one or more user devices.

15. A non-transitory computer-readable medium for storing instructions, the instructions comprising:
one or more instructions that, when executed by a processor of a device of a cloud computing environment, cause the processor to:
receive user requirements for the cloud computing environment,
the user requirements being received from one or more user devices,
each of the user requirements being particular to a user of the one or more user devices, and
each of the user requirements being associated with a corresponding one of the one or more user devices,
receive system requirements associated with the cloud computing environment,
the system requirements including quality of service (QoS) requirements for computing resources of the cloud computing environment,
generate one or more proposed arrangements of sets of computing resources, from the computing resources of the cloud computing environment, based on the user requirements and the system requirements,
each of the one or more proposed arrangements being associated with a corresponding one of the one or more user devices,
a proposed arrangement, of the one or more proposed arrangements, including at least a computing resource, a virtual machine, virtualized storage, and a hypervisor, of the cloud computing environment, arranged so that at least a portion of the user requirements and at least a portion of the system requirements are satisfied,
provide information associated with the one or more proposed arrangements to the one or more user devices,
receive a change to a particular proposed arrangement, of the one or more proposed arrangements, from a particular user device of the one or more user devices,
implement the change to the particular proposed arrangement in the cloud computing environment to generate an updated proposed arrangement,
the change to the particular proposed arrangement including a change to an arrangement of particular computing resources and particular virtual machines associated with the particular proposed arrangement,
provide the updated proposed arrangement to the particular user device, and
rebalance, automatically, the computing resources of the cloud computing environment based on the user requirements and the system requirements.

16. The computer-readable medium of claim 15, where the instructions further comprise:
one or more instructions that, when executed by the processor, cause the processor to:
generate a user interface that includes information associated with the particular proposed arrangement associated with the particular user device, and
provide the user interface to the particular user device.

17. The computer-readable medium of claim 15, where the instructions further comprise:
one or more instructions that, when executed by the processor, cause the processor to:
receive, via a user interface, an indication of acceptance of the updated proposed arrangement from the particular user device, and
implement the updated proposed arrangement in the cloud computing environment based on the indication of acceptance.

18. The computer-readable medium of claim 15, where the change to the particular proposed arrangement is received via a user interface.

19. The computer-readable medium of claim 15, where each of the user requirements includes at least one of:
placement of virtual machines, virtualized storage, or hypervisors in the computing resources of the cloud computing environment,
quality of service (QoS) requirements requested by each of the one or more user devices,
performance requirements requested by each of the one or more user devices, or
cost requirements requested by each of the one or more user devices.

20. The computer-readable medium of claim 15, where the information associated with the one or more proposed arrangements includes at least one of:
user interfaces providing representations of the sets of computing resources,
quality of service (QoS) requirements requested by each of the one or more user devices,
performance requirements requested by each of the one or more user devices, or
cost requirements requested by each of the one or more user devices.

\* \* \* \* \*